United States Patent [19]

O'Loughlin et al.

[11] Patent Number: 5,204,068
[45] Date of Patent: Apr. 20, 1993

[54] FILTER

[75] Inventors: John P. O'Loughlin; Eldron L. Boehmer; Timothy A. Swann, all of Mesa, Ariz.

[73] Assignee: TRW Inc., Lyndhurst, Ohio

[21] Appl. No.: 694,003

[22] Filed: May 1, 1991

[51] Int. Cl.$^5$ .................. B01D 53/34; B01D 50/00; B60R 21/26
[52] U.S. Cl. .................. 422/180; 422/177; 422/164; 422/167; 280/736; 280/740; 280/741; 55/525; 55/526; 55/527
[58] Field of Search .............. 422/177, 180, 164, 167; 280/736, 740, 741; 55/525, 526, 527

[56] References Cited

U.S. PATENT DOCUMENTS

| | | | |
|---|---|---|---|
| 3,797,854 | 3/1974 | Poole et al. | 280/741 |
| 4,017,100 | 4/1977 | Gehrig et al. | 280/736 |
| 4,322,385 | 3/1982 | Goetz | 422/165 |
| 4,360,957 | 11/1982 | Eng | 422/180 X |
| 4,680,040 | 7/1987 | Gooray et al. | 55/524 X |
| 4,878,690 | 11/1989 | Cunningham | 280/741 |
| 4,902,036 | 2/1990 | Zander et al. | 280/736 |

Primary Examiner—Robert J. Warden
Assistant Examiner—Stephanie Blythe
Attorney, Agent, or Firm—Tarolli, Sundheim & Covell

[57] ABSTRACT

A filter filters the gas generated by an air bag inflator. The gas comprises an alkali metal oxide. The inflator comprises a non-woven metal fibrous mat and small particles of a silicon compound, reactive with the alkali metal oxide, adhered to strands of the mat.

17 Claims, 2 Drawing Sheets

FILTER

BACKGROUND OF THE INVENTION

1. Technical Field

The present invention relates to a filter for an air bag inflator.

2. Description of the Prior Art

Inflators to expand an air bag, when a vehicle encounters sudden deceleration, such as in a collision, are well known. The inflated air bag restrains movement of an occupant of the vehicle during the collision. The air bag is inflated by gas generated through ignition of gas generating material. The gas generating material is contained in the air bag inflator.

A commonly used gas generating composition is one containing an alkali metal azide and a metal oxide, such as copper oxide or iron oxide. The composition may also contain an oxidizing agent such as sodium nitrate or ammonium perchlorate. Ignition of the gas generating composition produces a hot gas stream. The hot gas stream will typically include nitrogen gas, oxygen, molten metal, sodium oxide, a sodium salt of the metal, and metal nitride. The nitrogen gas carries the other reaction products, some of which are in the form of a residue or sinter. It is desirable to remove certain reaction products from the nitrogen gas stream before the gas streams enters the air bag.

U.S. Pat. No. 4,878,690 discloses a filter assembly used in a gas generator for a vehicle occupant restraint. The filter assembly comprises, in the direction of gas flow, a plurality of layers of 30 mesh stainless steel screen, a filter member for fine filtering the generated gas, and then another layer of 30 mesh stainless steel screen. The filter member can be an alumina-silica fiber paper such as "Lytherm" ceramic fiber paper marketed by Mansville Co. Other examples of filter paper disclosed in the patent are silica fiber paper marketed by Sandtex Corporation of Japan under the trademark "Sandtex" and a filter material sold by National Standard Corp. of Corbin, Ky. under the trademark "FIBREX".

U.S. Pat. No. 4,902,036 discloses a gas generator for a vehicle occupant restraint. The generator contains a plurality of filters including a final filter assembly which filters the nitrogen gas before the gas exits from the generator into an air bag. The final filter assembly comprises a first section of mesh screens. The mesh screens remove particulate reaction products from the gas stream. The final filter also has a second section of screens of smaller mesh size. The screen sections are separated by a pad formed from a ceramic fiber that is a mixture of aluminum oxide and silicon dioxide. The pad is sold under the trademark "Fiberfrax" by Sohio Carborundum, Inc.

SUMMARY OF THE INVENTION

The present invention relates to a filter for filtering the gas generated by an air bag inflator. The gas contains an alkali metal oxide. The filter comprises a fibrous mat having small particles of a silicon compound which are reactive with the alkali metal oxide and which are adhered to strands of the mat. The silicon compound reacts with the alkali metal oxide to form particles of alkali metal silicate. The coated strands of the mat define a plurality of tortuous paths of small enough diameter to entrap the particles of alkali metal silicate formed from the reaction of the silicon compound with the alkali metal oxide.

A preferred fibrous mat is a non-woven metal felt, preferably a non-woven nickel felt. A preferred silicon compound is silicon dioxide or a silicon dioxide/aluminum oxide blend. A preferred coating on the strands of the fibrous mat comprises fine particles of a metal, such as nickel, intermixed with the particles of the silicon compound. The fine particles of metal constrict the tortuous gas flow paths through the mat, and hold the particles of the silicon compound on the strands of the mat. Preferably, the particles of metal are adhered to the strands of the mat by sintering the particles to the strands.

A preferred filter comprises two layers of nickel felt having intermixed particles of silicon dioxide and nickel, with the particles of nickel being sintered to strands of the nickel felt, and a ceramic fiber mat, comprising a mixture of aluminum oxide fibers and silicon dioxide fibers, between the two layers of the nickel felt.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
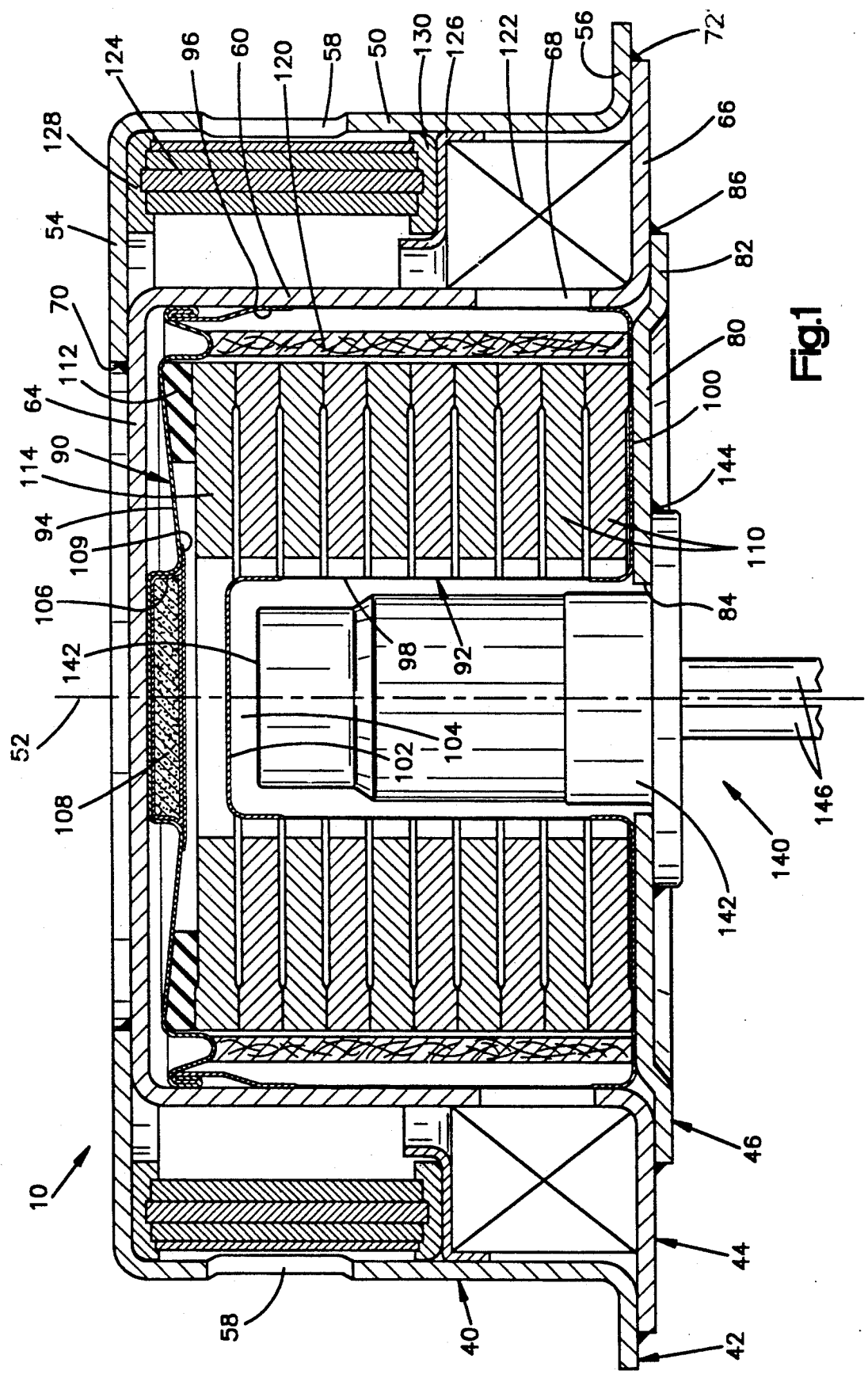
FIG. 1 is a sectional view of an air bag inflator containing a filter in accordance with the present invention.

FIG. 1 shows an air bag inflator 10 embodying the present invention. The inflator 10 includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 extends circumferentially around a lower portion of the combustion cup side wall 60.

The upper end wall 64 of the combustion cup 44 is welded with a continuous weld to the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but offset annular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely, a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion chamber side wall 60. The side wall 96 has a reduced thickness in the area adjacent the openings 68 in the combustion cup side wall 60. The canister lower section 92 also has a cylindrical inner side wall 98 spaced radially inward from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inward from and caps the inner side wall 98. The inner top wall 102 and the cylindrical inner side wall 98 define a downward opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 4,696,705. A preferred gas generating material is one containing sodium azide. The sodium azide, on combustion, forms sodium oxide. The gas generating material can contain an alkali metal azide other than sodium azide, such as lithium azide or potassium azide. Both lithium and potassium azides, on combustion, form an oxide of the alkali metal. The gas generating material also contains a metal oxide reactant for the azide, such as iron oxide and/or copper oxide. Further, the gas generating material preferably contains an oxidant, or oxygen supplying compound, such as sodium nitrate or ammonium perchlorate.

An annular prefilter 120 is disposed in the canister 90. The prefilter 120 is located radially outward of the gas generating disks 110 and inside the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter indicated at 124 is located inside the diffuser cup 42 above the slag screen 122. The final filter 124 is radially inward of the gas outlet openings 58 in the side wall 50 of the diffuser cup 42. The final filter 124 is a plurality of layers of various materials, to be described. The layers extend around the diffuser cup side wall 50 and are located inside the side wall. An annular filter shield 126 projects radially inward from the diffuser cup side wall 50 and separates the final filter 124 and the slag screen 122. The filter shield 126 is secured to the diffuser cup side wall 50 by an interference fit.

The inflator 10 includes an initiator assembly 140. The initiator assembly 140 includes the igniter 142 which projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The igniter 142 includes a pair of wire leads 146 which extend outward from the initiator assembly 140. The wire leads 146 are connectable to a collision sensor (not shown). Inside the igniter 142, the wire leads 146 are connected to a resistance wire embedded in an ignition material. A thin plastic film (not shown) is located on the outside of the upper portion of the igniter 142, to prevent metal-to-metal contact which could ground the igniter 142 and disable the inflator 10. The igniter 142 may be of any suitable well known construction.

Upon the occurrence of a collision or other sudden vehicle deceleration, the collision sensor closes an electrical circuit. An electrical current then flows through the wire leads 146 to the igniter 142. The resistance wire heats and ignites the ignition material. Ignition of the ignition material forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of hot gas.

The pressure of the gas acts on the cylindrical side wall 96 of the canister 90, forcing the side wall 96 radially outward against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outward through the prefilter 120. The prefilter 120 removes from the flowing gas some coarse particulates and other combustion products of the initiator assembly 140 and of the gas generating disks 110. The prefilter 120 also cools the gas, and molten combustion products plate on the prefilter. The gas flows through the openings 68 and into the slag screen 122.

The slag screen 122 traps and removes particles from the flowing gas. The slag screen also cools the flowing gas. When the gas cools, molten combustion products such as metal are plated onto the slag screen 122. The filter shield 126 between the slag screen 122 and the final filter 124 causes turbulent flow of gas to occur in and around the slag screen 122. The turbulent gas flow promotes the retention of relatively heavy particles in the slag screen 122 and in the lower portion of the diffuser cup 42.

The gas flows axially upward from the slag screen 122 to the final filter 124. The final filter 124 is in the shape of a ring covering the array of openings 58 in the diffuser cup side wall 50. The gas therefore flows radially outward through the final filter 124, which removes small particles from the gas. The final filter 124 also further cools the gas so that molten products in the gas may deposit on parts of the final filter 124. The annular array of gas outlet openings 58 directs the flow of gas into an air bag to inflate the air bag.

Figure 2:
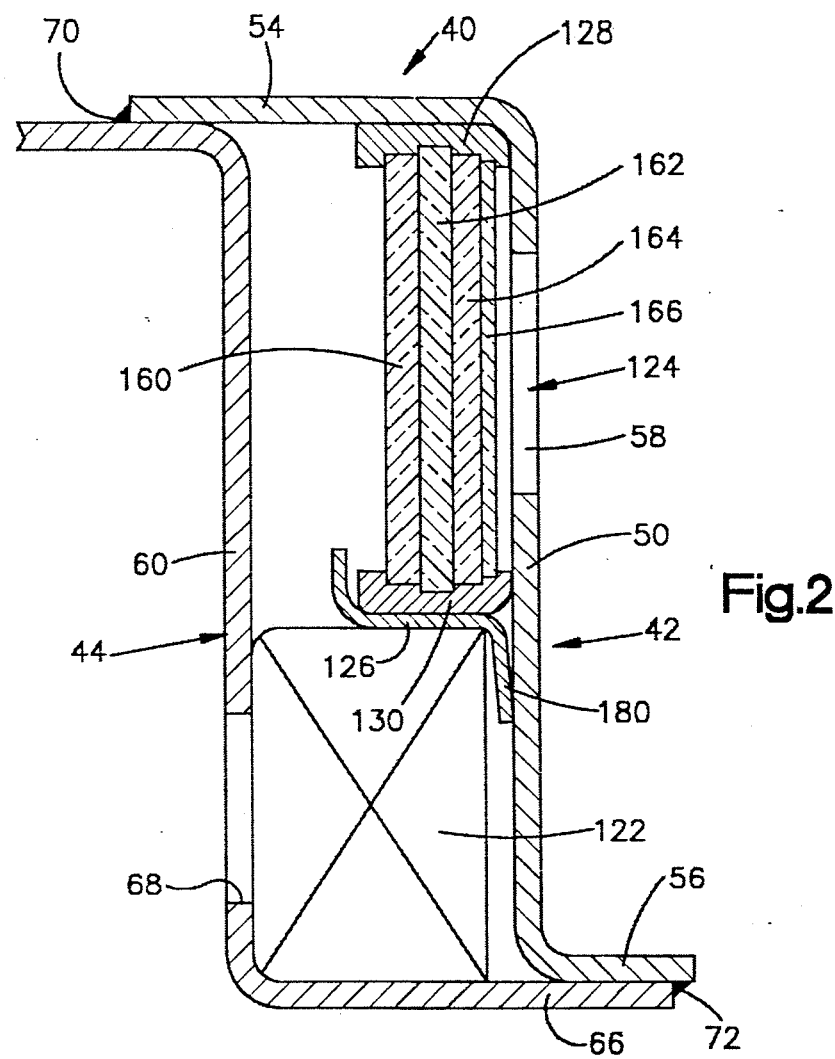
FIG. 2 is an enlarged, sectional view of a portion of the filter of FIG. 1.

Details of the filter 124 are shown in FIG. 2. The filter 124 has four layers, 160, 162, 164 and 166. The layer 160 is located radially innermost and is a coated, non-woven, fibrous metal mat. The layer 162 is adjacent the layer 160 and is a ceramic fiber mat. The layer 164 is adjacent the layer 162 and is also a coated, non-woven fibrous metal mat. The layer 166 is adjacent the layer 16 and is a metal mesh.

Figure 3:
FIG. 3 is an electron microscope photograph of a portion of a filter embodying the present invention. The photograph is at 250 magnification.

FIG. 3 is a photograph of one of the layers 160, 164. The layer shown in FIG. 3 comprises a substrate which is a random mass of intertwined strands, defining a plurality of tortuous passageways, and a particulate coating on the strands. The substrate is a nickel felt material marketed by National Standard Corp. of Corbin, Ky. under the trademark "Fibrex". This nickel felt is a non-woven felt of nickel fibers. The nickel felt prior to coating has a weight within the range of about 0.5 grams/in.$^2$ to about 1.5 grams/in.$^2$, a thickness of about 2.5 to about 3.5 mm, and a gas flow permeability in the range of about 0.5 to about 18.5 liters/minute/cm$^2$.

Instead of nickel, the metal felt can be made of other metals capable of withstanding the conditions to which the filter assembly is subjected. Examples of other suitable metals are carbon steel, stainless steel, copper, aluminum, titanium and chromium.

Another suitable non-woven, metal fibrous mat which can be used in the present invention is a reticulate metal mat marketed by Eltech Systems Corporation of Boca Raton, Fla. The reticulate metal mat is disclosed in U.S. Pat. No. 4,515,672, assigned to the Eltech Systems Corporation. The reticulate mat is made from an open cell polymer foam such as a polyurethane foam, having a small pore size, for instance, about 2 mm to about 0.15 mm in diameter. The foam is made conductive and then is plated with a metal such as copper or nickel. The foam, following plating, is then pyrolyzed to remove the polymer material leaving a reticulate metal structure.

The particulate coating on the strands of the substrate is a mixture of particles of silicon dioxide and particles of nickel. The dark particles, in FIG. 3, are nickel particles. The light particles, in FIG. 3, are silicon dioxide particles. The weight ratio of nickel particles to silicon dioxide particles, in FIG. 3, is 78:18. The coating particles are well distributed throughout the random, intertwined nickel strands, and the silicon dioxide particles ar homogeneously interspersed with the nickel particles.

The purpose of the coating is twofold. A principal purpose is to provide reactive sites in the mat for reaction of the silicon dioxide with the sodium and sodium oxide in the combustion gas being filtered to form sodium silicate. These reactions are embodied in the following equations:

$$Na_2O + SiO_2 \rightarrow Na_2SiO_3 \qquad (1)$$

$$2Na + SiO_2 + \tfrac{1}{2}O_2 \rightarrow Na_2SiO_3 \qquad (2)$$

In the above equation (2), oxygen is provided by an oxidant such as sodium nitrate or ammonium perchlorate.

A second function of the coating is to reduce the size of the openings in the mat for the entrapment of the silicate particles which are formed. Referring to FIG. 3, the closing of the openings of passageways in the mat, between the intertwined nickel strands in the mat, by the coating, is very evident.

The amount of silicon dioxide ($SiO_2$) in the coating composition is an amount effective to react with sodium oxide in the combustion gas being filtered. On a weight basis, the amount of silicon dioxide can vary from 100% of the coating composition to more than about 10%. Preferably, the silicon dioxide constitutes from about 15% to about 60% of the coating composition. The silicon dioxide powder can be a silica powder. A suitable silica powder is one marketed by Tammsco, Inc. of Tamms, Ill. under the trademark "Neosil". A preferred silica powder is "Neosil XV". This powder has an average particle size of about 2.8 microns. The powder is 98.9% pure $SiO_2$. Another suitable silica is a powder marketed by Cabot Corp. of Boston, Mass. under the trademark "Cab-O-Sil". This silica powder has an average particle size in the range of about 2-20 microns.

The coating composition can comprise other acidic oxides, such as aluminum oxide ($Al_2O_3$), in combination with the silicon dioxide. For instance, the coating composition can comprise equal amounts by weight of silicon dioxide and aluminum dioxide. Equations for the reaction of such a coating composition with sodium oxide are as follows:

$$Na_2O + Al_2O_3 + 2SiO_2 \rightarrow Na_2O.Al_2O_3.2SiO_2 \qquad (3)$$

$$Na_2O + Al_2O_3.2SiO_2 \rightarrow Na_2O.Al_2O_3.2SiO_2 \qquad (4)$$

The nickel powder in the coating is any fine particle size nickel powder, for instance an atomized nickel powder. In FIG. 3, the nickel powder has an average particle size of about 2.2-2.8 microns. The function of the nickel powder in the coating composition is to act as a binder or encapsulant to adhere the silicon dioxide particles to the substrate. The nickel particles are uniformly dispersed in the coating composition. The nickel particles preferably are sintered to the metal strands. Sintering also causes the nickel particles to adhere to each other. In this way, the nickel particles hold the silicon compound particles on the substrate and prevent the silicon compound particles from flaking off. The nickel particles, as shown in FIG. 3, also significantly close the passageways in the metal felt and reduce the permeability of the felt to the flow of combustion gas. This materially improves entrapment of the small silicate particles which are formed.

The amount of the nickel powder can be from 0% to about 90% of the coating composition, and preferably is about 40%-85% of the coating composition.

Other metal powders capable of being sintered or otherwise adhered to the strands of the metal substrate can be used, for instance, powders of iron, copper, aluminum, and stainless steel.

The amount of the coating composition applied to the strands of the metal substrate, on a weight basis, should be sufficient to provide a weight ratio, of substrate to coating, in the range of about 90:10 to about 50:50.

The coating composition can be applied to the metal substrate in any manner which causes the particles of the coating composition to adhere to the substrate. Preferably, the coating is applied to the metal substrate as an aqueous slurry of the metal particles, the silicon dioxide particles, and a binder. The slurry is calendered into the substrate. After calendaring, the substrate is dried at about 250° F. to 500° F., and then sintered, for instance, at about 1,900° F. The sintering bakes out any inorganic matter present and causes the metal particles to fuse to the metal strands of the substrate and to each other. The coating can be applied to one or both sides of the substrate and, if applied to both sides, can be calendared on both sides. In addition, the coating can be applied to one or both sides in a single pass or in multiple passes, for instance, up to four passes, with drying between each pass. After the multiple passes and drying, the coating is sintered.

By way of example, a slurry was prepared comprising 2,000 milliliters of water and 200 grams of silica marketed under the trademark "Neosil A". 21.5 grams of Dow "Methocell" cellulose ether thickener were added to the slurry. The slurry contained 18% by weight nickel powder. The slurry was subjected to mixing. The slurry was then applied to one side of a metal substrate. The metal substrate had a density of one gram/inch$^2$, a thickness of 3.25 mm and a weight of 130.7 grams. The slurry was applied to the substrate in four passes, with drying between each pass at 250° to 500° F. The coating was then sintered in a hydrogen/nitrogen atmosphere at 1,900° F. The total weight of the dried coated substrate at the end of each pass is given in the following Table.

TABLE

| First pass  | 132.8 gms |
|-------------|-----------|
| Second pass | 135.7 gms |
| Third pass  | 139.0 gms |
| Fourth pass | 141.7 gms |

The layer 162 of the filter 124 is a ceramic fiber mat sandwiched between layers 160 and 164. The ceramic fiber mat comprises a blend of aluminum oxide ceramic fibers and silicon dioxide ceramic fibers formed into the mat. The mat is marketed by Sohio Carborundum, Inc. of Niagara Falls, N.Y. under the trademark "Fiberfrax". The composition of the mat is at least about 47% $Al_2O_3$ fibers and at least about 47% $SiO_2$ fibers.

Instead of "Fiberfrax", the layer 162 can also be an alumina-silica ceramic mat marketed by Thermal Ceramics Inc. of Dunn, N.C. under the trademark "Ultrafelt". The composition of "Ultrafelt" is similar to that of "Fiberfrax", comprising about equal amounts of $SiO^2$ fibers and $Al_2O_3$ fibers. Other ceramic fibrous mats which can be used are alumina-silica mats marketed under the trademarks "Cerablanket" and "Cerachem" by Thermal Ceramics Inc. "Cerablanket" has a composition similar to that of "Fiberfrax". "Cerachem" contains about 36% $Al_2O_3$, 49% $SiO_2$ and 15% zirconium oxide ($Zr_2O_3$) fibers. The function of the silicon dioxide in each of the above mats is to react with and neutralize the sodium oxide in the gas flow, in accordance with known practice. This reaction forms small particles of sodium silicates.

Typically, the layer 162 has a relatively high density, small pore size and greater thickness than the layers 150, 152. By way of example, the following are specifications for "Fiberfrax":

| Density           | = | 10–12 lbs/ft$^3$      |
|-------------------|---|-----------------------|
| Bulk Fiber Density| = | 2.6–2.8 grams/cm$^3$  |
| Thickness         | = | about 0.125 inches    |

The material provides a pressure drop of about 45–68 mm $H_2O$.

The outer layer 166 is a 28 mesh metal cloth. The purpose of the outer layer is primarily to provide reinforcement and strength to the filter 124 and to hold the filter assembly together once formed into a ring.

The filter 124 is made by wrapping the multiple layers on a cylindrical mandrel (not shown). The layers are first preassembled as a strip. The strip is then wound on the cylindrical mandrel. The outermost layer 166, being a metal mesh, is wound so that it overlaps itself. The overlapping portions are then tack-welded together to form a tight, cylindrical integral filter assembly. The filter 124 can then be removed from the mandrel and does not unwrap.

In operation, the ceramic layer 162 of the filter 124 functions to provide a large proportion of the reactive sites for reaction of a substantial amount of sodium oxide in the combustion gas into sodium silicate. The purpose of the layer 160 of the filter is to provide some reaction sites for the reaction of sodium oxide to sodium silicate. This takes some of the reaction load off of the ceramic layer. The layer 160 also provides a heat sink to cool the combustion gas, and entrap molten or solid particles in the gas stream protecting the ceramic layer 162 from the molten particles. The layer 164 of the filter provides reactive sites for reacting silicon dioxide with the remainder of the sodium oxide in the gas. The layer 164 also functions to entrap silicate particles which are formed in the combustion gas in the layer 162.

Preferably, the layer 164 has a higher loading of coating than the layer 160, and thus smaller passageways. By way of example, the layer 160 may have a loading, on a weight basis, of about 80:20 felt to coating, and the layer 164 may have a loading, on a weight basis, of about 60:40 felt to coating. The higher loading in the layer 164 provides a plurality of passageways of smaller size for increased entrapment of silicate particles.

FIG. 2 shows the manner in which the filter 124 is sealed within the inflator housing. An upper seal 128 is positioned between the upper edge of the final filter 124 and the diffuser cup end wall 54. A lower seal 130 is positioned between the lower edge of the filter 124 and the filter shield 126. The seals 128 and 130 are each in the shape of a ring compressed between the filter 124 and the respective parts 54, 126 of the inflator housing. A preferred seal is a "Type 5" flexible graphite seal as defined in ASTM Standard F-104. One suitable graphite seal, marketed by UCAR Carbon Company Inc., a division of Union Carbide in Cleveland, Ohio, has a characteristic identification number, per ASTM F-104, of F527000. This is a laminated graphite seal having a compressibility of about 30% to about 50%.

Instead of a graphite seal, the filter can also be sealed with a material such as a silicone rubber. One suitable silicone rubber is marketed by General Electric Company of Pittsfield, Mass. under the trademark "RTV" silicone. The letters RTV stand for "Room Temperature Vulcanizing". Any suitable sealing material or technique could be used to provide a seal between the filter and the inflator housing.

Variations within the scope of the present invention will be apparent to those skilled in the art. For instance, the present invention can be practiced without the use of an intermediate ceramic layer 162. The filter could also have more than one ceramic layer 162, for instance, two ceramic layers. Also, the filter could have one or more metal mesh inner layers inside layer 160. The filter could also have more than one outer metal mesh layer 166. The layers 160, 162 can be identical or different. The numbers and make-up of the filter layers will depend primarily upon the composition and volume of the gas flow from the inflator.

Advantages of the present invention should be apparent to those skilled in the art. For instance, filters in air bag inflators have heretofore had multiple mesh layers. The mesh layers are both expensive and heavy. The present invention reduces the requirement for layers of mesh. In addition, filters in air bag inflators have plural ceramic layers. The filter 124 comprises only one ceramic layer, reducing weight and cost of the filter. Moreover, as indicated above, the present invention can be practiced without any ceramic layer.

From the above description of the invention, those skilled in the art will perceive other improvements, changes and modifications. Such improvements, changes and modifications within the skill of the art, are intended to be covered by the appended claims.

Having described the invention, the following is claimed:

1. A filter for filtering the exhaust gas of an air bag inflator, in which said exhaust gas comprises an alkali metal oxide, comprising:
   a fibrous mat comprising a plurality of strands defining a plurality of tortuous passageways for the flow of an exhaust gas comprising an alkali metal oxide; and
   a coating on said strands;
   said coating comprising particles of a silicon compound adhered to the strands of said mat, said silicon compound being reactive with an alkali metal oxide to form particles of an alkali metal silicate;
   said coating being present in an effective amount to constrict said passageways to small enough diameters to entrap said particles of alkali metal silicate.

2. The filter of claim 1 wherein said mat is a non-woven metal felt.

3. The filter of claim 2 wherein said non-woven metal felt is a nickel felt.

4. The filter of claim 3 wherein said silicon compound is silicon dioxide.

5. A filter for filtering the exhaust gas of an air bag inflator, in which said exhaust gas comprises an alkali metal oxide, comprising:
   a fibrous mat comprising a plurality of strands defining passageways for the flow of said exhaust gas; and
   a coating on said strands;
   said coating comprising particles of a silicon compound, reactive with an alkali metal oxide, adhered to the strands of said mat, and particles of metal sintered to the strands of the mat and to each other, said particles of silicon compound being interspersed with the particles of metal and adhered to the mat by said particles of metal.

6. The filter of claim 5 wherein said metal particles are particles of nickel.

7. The filter of claim 5 wherein said mat is a non-woven metal felt.

8. The filter of claim 7 wherein said non-woven metal felt is a nickel felt.

9. The filter of claim 8 wherein said silicon compound is silicon dioxide.

10. The filter of claim 7 wherein said metal felt is coated with particles of silicon dioxide and nickel, said felt having a gas permeability in the range of about 6–18 liters/min/cm$^2$.

11. The filter of claim 7 wherein said non-woven metal felt is a reticulate metal substrate.

12. The filter of claim 5 wherein said mat is a first non-woven metal fibrous mat, said filter further comprising a second non-woven metal fibrous mat spaced from said first non-woven metal fibrous mat, said second non-woven metal fibrous mat comprising particles of metal sintered to the strands of the mat and to each other and particles of silicon dioxide interspersed with the particles of metal and adhered to the strands by said particles of metal, said filter further comprising an intermediate mat of $SiO_2$ and $Al_2O_3$ ceramic fibers between said first and second non-woven metal fibrous mats.

13. The filter of claim 12 in the shape of a ring, wherein one of said non-woven metal fibrous mats has a weight ratio of mat to silicon dioxide and metal particles combined of about 80:20, and the other of said non-woven metal fibrous mats has a weight ratio of mat to silicon dioxide and metal particles combined of about 60:40.

14. A filter for filtering the exhaust gas of an air bag inflator, in which said exhaust gas comprises an alkali metal oxide, comprising:
   a fibrous metal mat comprising a plurality of strands;
   particles of a silicon compound, reactive with an alkali metal oxide, adhered to the strands of said mat; and
   particles of a metal sintered to the strands of the mat and to each other, said particles of a silicon compound being interspersed with the particles of a metal and adhered to the strands by said particles of a metal.

15. The filter of claim 14 wherein said mat is a non-woven metal felt and said metal particles are sintered to the strands of said metal felt.

16. The filter of claim 15 wherein said metal felt is a nickel felt and said metal particles are particles of nickel.

17. A filter for filtering the exhaust gas of an air bag inflator, in which said exhaust gas comprises an alkali metal oxide, comprising:
   a fibrous metal mat comprising a plurality of strands defining passageways for the flow of an exhaust gas;
   particles of a silicon compound, reactive with an alkali metal oxide, in said mat in an effective amount to react with an alkali metal oxide in said exhaust gas to form an alkali metal silicate;
   particles of a metal sintered to the strands of the mat and to each other, said particles of a silicon compound being interspersed with the particles of a metal, the amount of particles of a metal being an effective amount to adhere the particles of a silicon compound to said strands;
   both said effective amounts being effective to constrict the passageways of said fibrous mat.

* * * * *